(12) United States Patent
Liu et al.

(10) Patent No.: US 8,346,446 B2
(45) Date of Patent: Jan. 1, 2013

(54) CLUTCHLESS TRANSMISSION APPARATUS FOR CONTROLLING GEAR-POSITION SHIFTING AND CONTROL METHOD THEREOF

(75) Inventors: Kai Liu, Shenzhen (CN); Jian Gong, Shenzhen (CN); Xuguang Zhou, Shenzhen (CN); Bo Zu, Shenzhen (CN); Guangming Yang, Shenzhen (CN); Axi Qi, Shenzhen (CN); Xiaohua Tang, Shenzhen (CN); Bo Zhou, Shenzhen (CN); Xunjin Xu, Shenzhen (CN)

(73) Assignee: BYD Co. Ltd. (CN)

( * ) Notice: Subject to any disclaimer, the term of this patent is extended or adjusted under 35 U.S.C. 154(b) by 602 days.

(21) Appl. No.: 12/596,524

(22) PCT Filed: Apr. 18, 2008

(86) PCT No.: PCT/CN2008/070752
§ 371 (c)(1),
(2), (4) Date: Oct. 19, 2009

(87) PCT Pub. No.: WO2008/128474
PCT Pub. Date: Oct. 30, 2008

(65) Prior Publication Data
US 2010/0114441 A1   May 6, 2010

(30) Foreign Application Priority Data

Apr. 20, 2007   (CN) .......................... 2007 1 0098247

(51) Int. Cl.
*B60W 10/08* (2006.01)
*B60W 10/10* (2006.01)
*F16H 59/46* (2006.01)

(52) U.S. Cl. ............. 701/53; 701/22; 701/66; 180/65.7; 180/65.8

(58) Field of Classification Search .................. None
See application file for complete search history.

(56) References Cited

U.S. PATENT DOCUMENTS
5,395,293 A * 3/1995 Matsuura et al. ............... 477/15
(Continued)

FOREIGN PATENT DOCUMENTS
CN   1974262 A     6/2007
EP   0657322 A1 *  6/1995
(Continued)

OTHER PUBLICATIONS

International Search Report dated Jun. 30, 2008 issued in related PCT Application No. PCT/CN2008/070752 (International Publication No. WO 2008/128474).

*Primary Examiner* — Michael J. Zanelli
(74) *Attorney, Agent, or Firm* — Brinks Hofer Gilson & Lione

(57) ABSTRACT

A clutchless transmission apparatus and control method thereof. The transmission apparatus comprises a motor (10) and a transmission (20), said motor (10) is connected to said transmission (20) and supplies power to said transmission (20) via an input shaft of the transmission (20), wherein said apparatus further comprises a control device (30), which is electrically connected to said motor (10) and said transmission (20), wherein said control device (30) is configured to determine whether a gear-position shifting is required based on rotation speed of said transmission (20), if a gear-position shifting is required, regulates torque of said motor (10) to control said transmission (20) to disengage, and then regulates the rotation speed of said motor (10) based on the rotation speed of said transmission (20) to control said transmission (20) to engage for shifting gear-position. The clutchless transmission apparatus provided in the present invention doesn't need a clutch during gear-position shifting, and therefore it is light, simple, easy to maintain and control, and can be used in a wide range of application.

13 Claims, 3 Drawing Sheets

U.S. PATENT DOCUMENTS

| | | |
|---|---|---|
| 5,411,450 A | 5/1995 | Gratton et al. |
| 5,795,260 A | 8/1998 | Kim |
| 5,884,201 A * | 3/1999 | Kawai ............................. 701/22 |
| 5,951,436 A * | 9/1999 | Kim ................................ 477/20 |
| 7,169,077 B2 * | 1/2007 | Laurent et al. ................... 477/15 |
| 2004/0214687 A1 | 10/2004 | Morisawa et al. |

FOREIGN PATENT DOCUMENTS

| | | |
|---|---|---|
| WO | WO98/12065 | 3/1998 |
| WO | WO03/024736 A1 | 3/2003 |

* cited by examiner

CLUTCHLESS TRANSMISSION APPARATUS FOR CONTROLLING GEAR-POSITION SHIFTING AND CONTROL METHOD THEREOF

CROSS-REFERENCE TO RELATED APPLICATIONS

This application is a national phase application of PCT Application No. PCT/CN2008/070752, filed Apr. 18, 2008, which claims priority from Chinese Patent Application No. 2007-10098247.1, filed Apr. 20, 2007, both contents of which are incorporated herein by reference in their entirety.

FIELD OF INVENTION

The present invention relates to a transmission apparatus for controlling gear-position shifting and a control method thereof, particularly to a clutchless transmission apparatus for controlling gear-position shifting speed and a control method thereof.

BACKGROUND

In a conventional internal combustion engine automobile, the functions of a clutch are: making the automobile starts stably; interrupting the power supply to the transmission apparatus to assist gear-position shifting; and preventing from overloading on the transmission apparatus. However, the implement for above functions with clutch not only requires the driver to operate skillfully but also causes power interruption inevitably; as a result, the acceleration/deceleration of the automobile is not smooth enough. In addition, the clutch operates by utilizing the friction on contact surfaces between drive part and driven part, utilizing liquid as driving medium or utilizing magnetic force for driving; therefore, the clutch has aging and wearing problems. Furthermore, in a hybrid automobile or electric automobile, since the motor can start the automobile with loads, the startup procedure doesn't need a clutch used in traditional internal combustion engine automobiles. Therefore, when designing a transmission apparatus for hybrid automobile or electric automobile, it is desired that to design a clutchless transmission apparatus and a control method to adapt for the intrinsic characteristics of motor, rather than to improve traditional transmission apparatuses in prior arts, such as the gear-position shifting control method used in a clutchless variable speed operated parallel hybrid automobiles as disclosed in CN1272203C.

SUMMARY OF INVENTION

In order to overcome the drawbacks of the above traditional control method thereof in operability, power performance, and component durability, the present invention provides a clutchless transmission apparatus for controlling gear-position shifting and the control method thereof, which is operated easily, delivers good power performance, and is essentially free of component durability problem.

The clutchless transmission apparatus for controlling gear-position shifting provided in the present invention comprises a motor and a transmission; said motor is connected to said transmission and supplies power to said transmission 20 via an input shaft of the transmission; wherein, said apparatus further comprises a control device, which is electrically connected to said motor and said transmission and is configured to determine whether a gear-position shifting is required based on rotation speed of said transmission; if a gear-position shifting is required, regulate torque of said motor firstly, to control said transmission to disengage, and then regulate rotation speed of said motor based on the rotation speed of said transmission to control said transmission to engage for shifting gear-position.

The present invention also provides a control method for shifting gear-position comprising: determining whether a gear-position shifting is required based on rotation speed of said transmission; if a gear-position shifting is required, regulating torque of said motor firstly, to control said transmission to disengage, and then regulating rotation speed of said motor based on the rotation speed of said transmission to control said transmission to engage for shifting gear-position.

The clutchless transmission apparatus provided in the present invention doesn't need clutch during gear-position shifting; instead of this, it controls gear-position shifting of the transmission based on the rotation speed detected and then controls the torque and rotation speed of the motor to adapt for gear-position shifting of the transmission. The transmission apparatus has advantages such as light weight, easy maintenance, simple structure, easy control, and wide range of application.

BRIEF DESCRIPTIONS OF THE DRAWINGS

DETAILED DESCRIPTION OF THE PREFERRED EMBODIMENTS

Hereafter the present invention will be described in detailed with the accompanying drawings.

Figure 1:
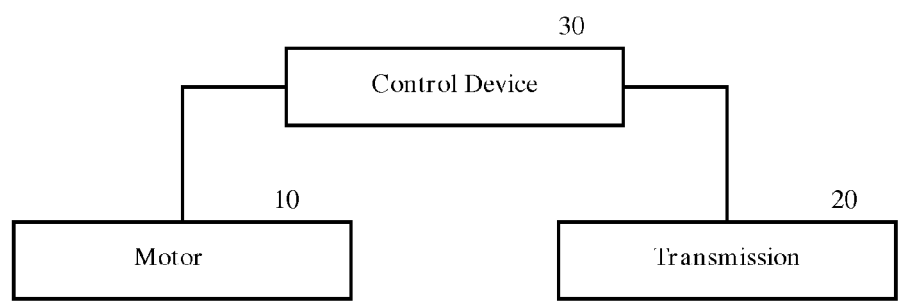
FIG. 1 is a structural diagram of the clutchless transmission apparatus provided in the present invention.

As shown in FIG. 1, the transmission apparatus provided in the present invention comprises a motor 10 and a transmission 20.

The structure and working principle of the motor 10 is well known by those skilled in the art; said motor 10 can be any motor that is known by those skilled in the art, and therefore will not be described in details here.

The structure of the transmission 20 is also well known by those skilled in the art; for example, said transmission 20 can be a double-shaft transmission or three-shaft transmission. Here, the case of two-shaft transmission is discussed, which mainly comprises an input shaft, an output shaft, several sets of gears, and a gear-position shifting actuator. Since the motor 10 can be controlled to rotate in reverse direction easily, the transmission 20 described in the present invention is preferably a transmission without reverse gear-position.

Said motor 10 is connected to said transmission 20 and supplies power to said transmission 20 via the input shaft of said transmission 20. No clutch is required between said motor 10 and said transmission 20, and said motor 10 can be connected to said transmission 20 in any manner well known by those skilled in the art, for example, via a shaft-coupling or a spline. Wherein, said transmission apparatus further comprises a control device 30, which is electrically connected to said motor 10 and said transmission 20; wherein, said control device 30 determines whether a gear-position shifting is required based on rotation speed of said transmission 20; if a gear-position shifting is required, said control device 30 will regulate torque of said motor 10 to control said transmission 20 to disengage, and then regulate the rotation speed of said motor 10 based on the rotation speed of said transmission 20 to control said transmission 20 to engage.

Figure 2:
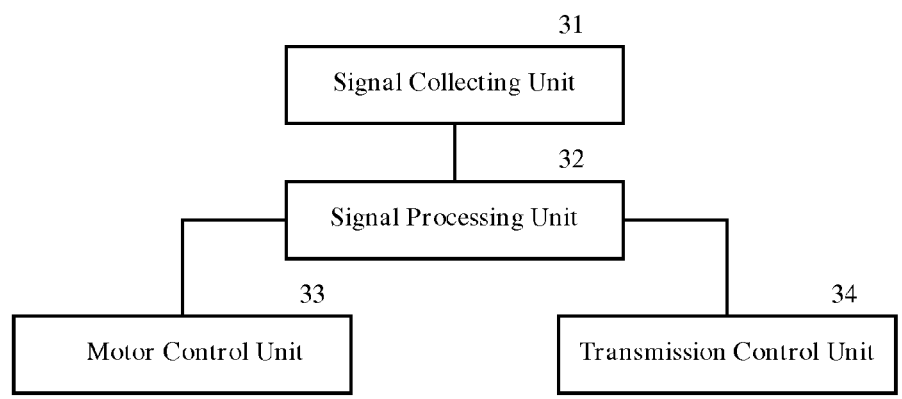
FIG. 2 is a structural diagram of the control device used in the clutchless transmission apparatus provided in the present invention.

As shown in FIG. 2, said control device 30 comprises a signal collecting unit 31 and a signal processing unit 32 that are electrically connected to each other, a motor control unit 33 and a transmission control unit 34 that are electrically connected to said signal processing unit 32 respectively. Wherein, said signal collecting unit 31 is configured to collect rotation speed of said transmission 20; said signal processing unit 32 is configured to receive the rotation speed of transmission 20 collected by said signal collecting unit 31 and determine whether a gear-position shifting is required at the rotation speed, and if a gear-position shifting is required, send instructions for regulating torque or rotation speed of said motor 10 to said motor control unit 33; when the regulation of torque or rotation speed of said motor 10 is completed, said signal processing unit 32 sends instructions for controlling said transmission 20 to disengage or engage to said transmission control unit 34; said motor control unit 33 is configured to receive the instruction for regulating torque or rotation speed of said motor from said signal processing unit 32 and regulate the torque or the rotation speed of said motor 10 under the received instruction; said transmission control unit 34 is configured to receive the instructions for disengaging or engaging said transmission 20 from said signal processing unit 32 and control said transmission 20 to disengage or engage under the received instructions.

Said signal processing unit 32 stores a plurality of rotation speed thresholds $S_i$ corresponding to each gear position, a plurality of torques $M_i$ of the motor 10 under zero load at each rotation speed threshold $S_i$, and a plurality of transmission ratios $K_i$ corresponding to each gear position. The corresponding relation between torque $M_i$ and rotation speed $S_i$ is: $M_i$ is in direct proportion to $dS/dt$, and the proportion factor is a constant for a given motor. The rotation speed thresholds $S_i$, torques $M_i$ and transmission ratios $K_i$ can be stored in a memory.

Said control device 30 further comprises: said signal collecting unit 31, configured to collect the current rotation speed S of transmission 20 in real time; said signal processing unit 32, configured to receive said current rotation speed S, compare said current rotation speed S with the stored rotation speed thresholds $S_i$ one by one to determine whether a gear-position shifting is required at the current rotation speed S, read out the torque M and transmission ratio K corresponding to the current rotation speed S, and choose a target gear position according to the current gear position with reference to or not with reference to the changing trend of current rotation speed S, and send instructions for regulating torque or rotation speed of the motor 10 to the motor control unit 33 and instructions for disengaging or engaging the transmission 20 to the transmission control unit 34; said motor control unit 33, configured to receive the instruction for regulating torque or rotation speed from the signal processing unit 32 and regulate the torque of motor to M and the rotation speed of motor to S/K; and said transmission control unit 34, configured to receive the instruction for disengaging or engaging from the signal processing unit 32 and instruct the transmission 20 to disengage or engage synchronizer with gear. In details, when the torque of motor 10 is regulated to M, the interaction force between the synchronizer and the gear in the transmission 20 at the current gear position is approximately zero, and therefore it is easy to disengage them without injury to the mechanical parts; at that moment, the signal processing unit 32 instructs the transmission 20 to disengage. While, when the rotation speed of the motor 10 is regulated to S/K, the rotation speed difference between the synchronizer and the gear in the transmission 20 at the target gear position is approximately zero, and therefore it is easy to engage them without injury to the mechanical parts; at that moment, the signal processing unit 32 instructs the transmission 20 to shift to the target gear position.

According to a preferred embodiment, the components in said control device 30 are further configured as follows: said signal processing unit 32 is configured to send the instruction for regulating motor torque to said motor control unit 33 firstly, and choose said target gear position according to the current gear position with reference to or not with reference to the changing trend of the current rotation speed S; said motor control unit 33 is configured to receive the instruction for regulating motor torque from said signal processing unit 32, regulate the torque of said motor 10 to M, and send a feedback signal indicating the torque synchronization is completed to said signal processing unit 32; said signal processing unit 32 is configured to receive the feedback signal indicating the torque synchronization is completed from said motor control unit 33, and send the instruction for disengaging to said transmission control unit 34; said transmission control unit 34 is configured to receive the instruction for disengaging from said signal processing unit 32, instruct said transmission 20 to disengage, and send a feedback signal indicating the disengagement is completed to said signal processing unit 32; said signal processing unit 32 is configured to receive the feedback signal indicating the disengagement is completed from said transmission control unit 34, receive the updated rotation speed S' of said transmission 20, and send the instruction for regulating rotation speed of the motor 10 to said motor control unit 33; said motor control unit 33 is configured to receive the instruction for regulating rotation speed of the motor 10 from said signal processing unit 32, regulate the rotation speed of said motor 10 to S'/K, and send a feedback signal indicating the rotation speed synchronization is completed to said signal processing unit 32; said signal processing unit 32 is configured to receive the feedback signal indicating the rotation speed synchronization is completed from said motor control unit 33, and send the instruction for engaging to said transmission control unit 34 for gear-position shifting; and said transmission control unit 34 is configured to receive the instruction for engaging from said signal processing unit 32, and instructs said transmission 20 to engage for shifting to the target gear position.

In the apparatus provided in the present invention, said disengagement and engagement operations are implemented by gear-position shifting actuator of said transmission 20 under the instruction from said transmission control unit 34 by means of electric signals. Said gear-position shifting actuator is configured to implement disengagement by disengaging the gear in the current gear position from the input shaft and implement engagement by engaging the gear in the target gear position to the output shaft. The structure, connection means, and working principle of said gear-position shifting actuator are well known by those skilled in the art; for example, it can be implemented with any synchronizer, and the gear-position shifting actuator will not be described in details here.

In the apparatus provided in the present invention, said signal collecting unit 31 is a rotation speed sensor, which can be implemented as a photoelectric sensor, a Hall sensor, or a magnetic induction sensor, mounted on the output shaft of said transmission 20, and configured to detect the rotation speed of said transmission 20.

In the apparatus provided in the present invention, said rotation speed thresholds $S_i$ are set as follows: the number of said rotation speed thresholds $S_i$ is N, and threshold $S_i$=maximum rotation speed×i/N, where, $2 \leq N<10$, i is an integer, and $0<i<N$. When above threshold setting method is used, in order to choose said target gear position, it is required to detect the changing trend of the rotation speed and determine whether to gear up or gear down in accordance with increase/decrease of the rotation speed.

Preferably, in order to reduce frequent gear-position shifting and simplify the judgment so as to choose the target gear position solely according to the current gear position, in the apparatus provided in the present invention, the number of said rotation speed thresholds $S_i$ is 2N, and threshold $S_i$=maximum rotation speed×i/N±Y, where $2 \leq N<10$, i is an integer and $0<i<N$, and Y is much smaller than S, and is different for different thresholds $S_i$. Specifically, there are two thresholds between every two gear positions, wherein, maximum rotation speed×i/N+Y is the threshold for shifting from a lower gear position to a higher gear position, while maximum rotation speed×i/N−Y is the threshold for shifting from a higher gear position to a lower gear position. Wherein, Y is an integer much smaller than $S_i$, and can be set to a percentage of $S_i$, e.g., 2-5%. However, if $S_i$ is great, 5% of $S_i$ will be too great against timely gear-position shifting; therefore Y can be set to different values depending on different thresholds $S_i$. Preferably, if $S_i$ is great, the ratio of $Y/S_i$ can be decreased appropriately, e.g., to 2%.

In the apparatus provided in the present invention, said control device 30 can be implemented conveniently in the electronic control unit of the automobile, or it can be implemented by means of a DSP or embedded system.

The present invention also provides a control method for shifting gear position, comprising: determining whether a gear-position shifting is required based on rotation speed of said transmission 20; if so, regulating torque of said motor 10 firstly, to control said transmission 20 to disengage, and then regulating rotation speed of said motor 10 based on the rotation speed of said transmission 20 to control said transmission 20 to engage for gear-position shifting.

Figure 3:
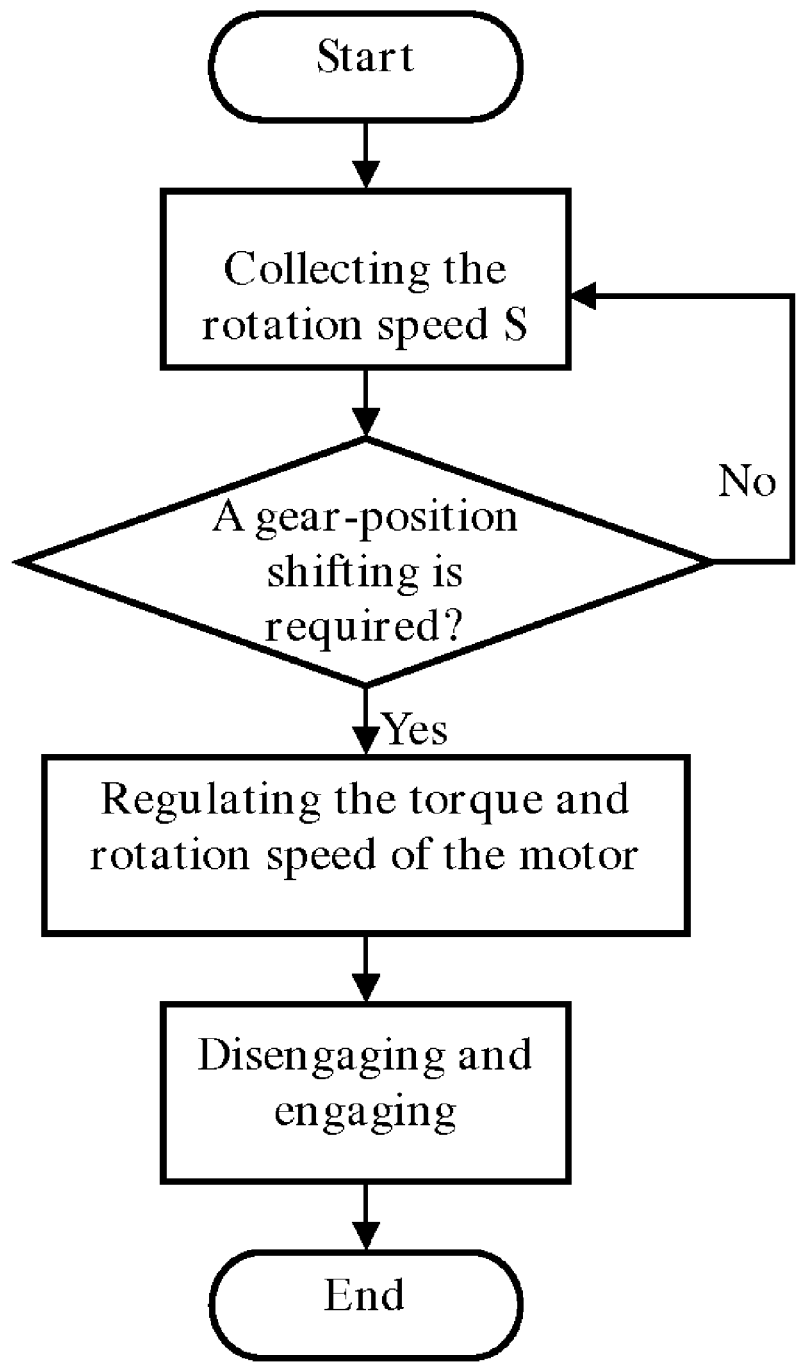
FIG. 3 is a flow diagram of the control method for shifting gear-position provided in the present invention.

As shown in FIG. 3, the control method provided in the present invention comprises the following steps: collecting the rotation speed of said transmission 20; determining whether a gear-position shifting is required at that rotation speed; if so, regulating the torque and rotation speed of said motor 10; when the regulation of torque of said motor 10 is completed, disengaging said transmission 20; and when the regulation of rotation speed of said motor 10 is completed, engaging to gear position of said transmission 20.

Figure 4:
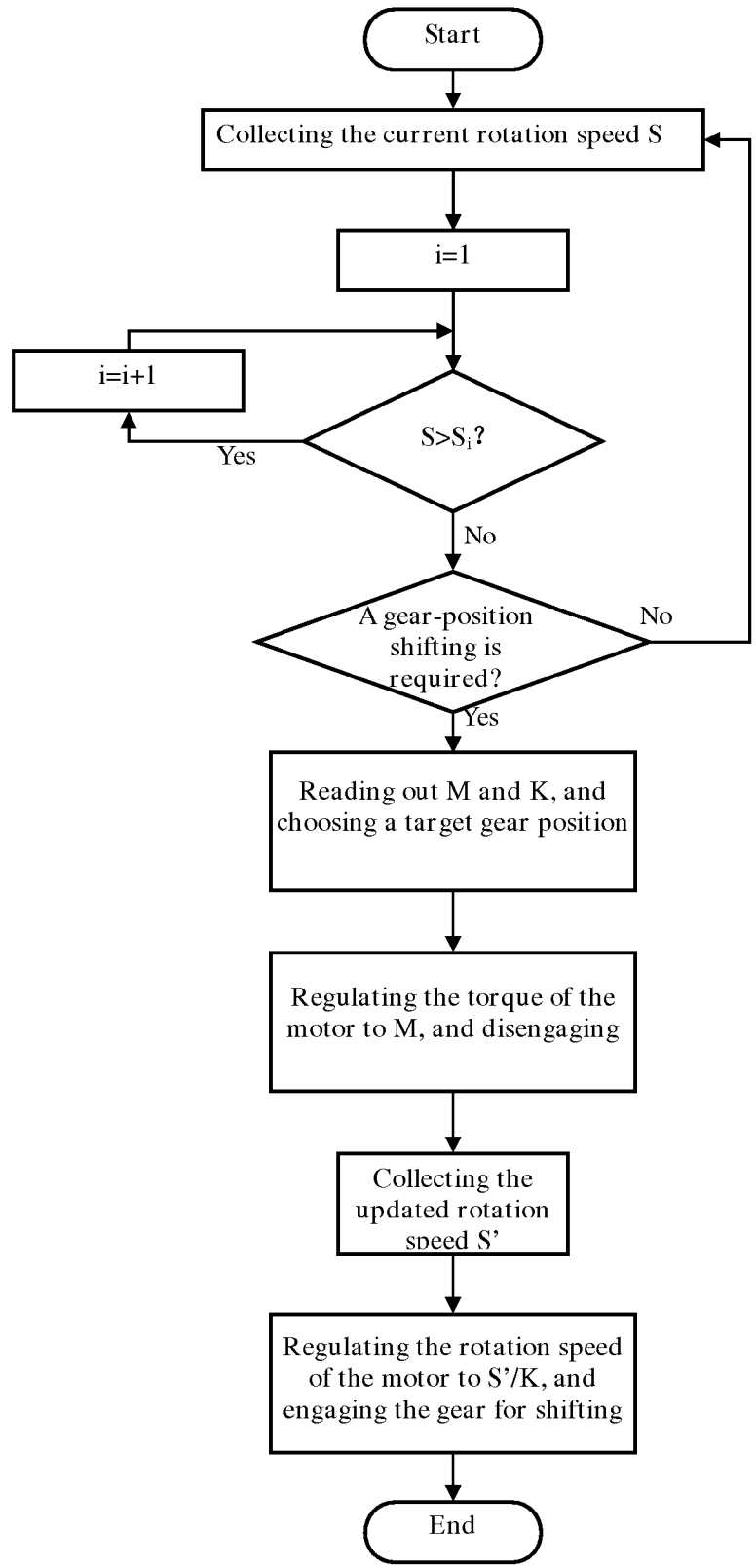
FIG. 4 is a schematic flow diagram of gear-up with the control method provided in the present invention.

As shown in FIG. 4, the control method provided in the present invention further comprises the following steps: storing a plurality of rotation speed thresholds $S_i$ corresponding to each gear position, a plurality of torques $M_i$ of the motor 10 under zero load at each rotation speed threshold $S_i$, and a plurality of transmission ratios $K_i$ corresponding to each gear position; collecting the current rotation speed S of said transmission 20; comparing the current rotation speed S with the rotation speed thresholds $S_i$ one by one to determine whether a gear-position shifting is required at the current rotation speed S; reading out the torque M and the transmission ratio K corresponding to the current rotation speed S, and choosing a target gear position according to the current gear position with reference to or not with reference to the changing trend of the current rotation speed S; regulating the torque of the motor 10 to M and the rotation speed of the motor to S/K; when the torque of the motor is regulated to M, instructing the transmission 20 to disengage; when the rotation speed of the motor is regulated to S/K, engaging to said target gear position.

The control method provided in the present invention further comprises the following steps: regulating the torque of the motor 10 to M; indicating the torque synchronization is completed; instructing the transmission 20 to disengage; indicating the disengagement is completed; collecting the updated rotation speed S' of the transmission 20; regulating the rotation speed of said motor 10 to S'/K; indicating the rotation speed synchronization is completed; instructing the transmission 20 to engage to the target gear position.

In the control method, said rotation speed thresholds $S_i$ are set as follows: the number of said rotation speed thresholds S, is N, and threshold $S_i$=maximum rotation speed×i/N, where, $2 \leq N<10$, i is an integer, and $0<i<N$.

Preferably, the number of said rotation speed thresholds $S_i$ is 2N, and threshold $S_i$=maximum rotation speed×i/N±Y, where, $2N<10$, i is an integer and $0<i<N$, Y is an integer much smaller than $S_i$ and can be different for different thresholds $S_i$.

Hereafter the working principle and process of the present invention will be described in detail in the example of a two-speed transmission.

In the first threshold setting method, only one threshold is to be set, and $S_1$=maximum rotation speed/2. The automobile starts and runs at a low speed, and when the rotation speed exceeds $S_1$, the signal processing unit 32 sends an instruction to the motor control unit 33 firstly to regulate the motor torque; the motor control unit 33 receives the instruction for regulating motor torque from the signal processing unit 32 and regulates the motor torque to M; at that moment, the engaging resistance between the synchronizer and the gear of the transmission in the current gear position is minimum, and the motor control unit 33 sends a feedback signal to the signal processing unit 32 to indicate the torque synchronization is completed; the signal processing unit 32 receives the feedback signal indicating the torque synchronization is completed from the motor control unit 33, and sends an instruction to the transmission control unit 34 to disengage; the transmission control unit 34 receives the instruction for disengagement from the signal processing unit 32, and instructs the transmission to disengage; at that moment, the shifting fork shifts the synchronous gear ring into neutral position, and sends a feedback signal to the signal processing unit 32 to indicate the disengagement is completed; the signal processing unit 32 receives the feedback signal indicating the disengagement is completed from the transmission control unit 34, receives the updated rotation speed S' of the transmission, and sends an instruction to the motor control unit 33 to regulate the rotation speed of the motor 10; the motor control unit 33 receives the instruction for regulating motor speed from the signal processing unit 32, regulates the rotation speed of the motor 10 to S'/K, and sends a feedback signal to the signal processing unit 33 to indicate the rotation speed synchronization is completed; the signal processing unit 32 receives the feedback signal indicating the rotation speed synchronization is completed from the motor control unit 33, and sends a engaging instruction to the transmission control unit 34; the transmission control unit 34 receives the engaging instruction from the signal processing unit 32, and instructs the transmission 20 to shift into the higher gear position.

When the automobile slows down to a rotation speed smaller than $S_1$, gear-down is required; the operating procedures are similar to those for gear-up, and therefore will not be described here.

In the second threshold setting method, two thresholds have to be set, and $S_1$=maximum rotation speed/2−Y and $S_2$=maximum rotation speed/2+Y, where, Y=maximum rotation speed×5%. When the automobile speeds up to a rotation speed higher than $S_2$, gear-up is required; whereas when the automobile slows down to a speed lower than $S_1$, gear-down is required. The operating procedures are similar to those described above, and therefore will not be described here.

Since the motor 10 can be easily controlled to rotate in reverse direction by applying reverse voltage, it is unnecessary to arrange reverse gear and corresponding drive mechanism; when reversal is required, it is only need to control the motor 10 to rotate in reverse direction and increase the torque.

We claim:

1. A clutchless transmission apparatus for controlling gear-position shifting, comprising:
    a motor;
    a transmission having an input shaft for receiving power;
    the motor configured to supply power to the input shaft of the transmission;
    a control device operatively coupled to the motor and to the transmission, wherein the control device is configured to:
        determine whether a gear-position shifting is required based on a rotational speed of the transmission;
        if a gear-position shifting is required, regulate a torque of the motor to control the transmission to disengage, and then regulate a rotational speed of the motor based on a rotational speed of the transmission to control the transmission to engage; and
    wherein the transmission further includes a gear-position shifting actuator configured to control the engagement and disengagement of the transmission under electrical control by a transmission control unit.

2. The apparatus as claimed in claim 1, wherein the control device comprises:
    a signal collecting unit configured to determine a rotational speed of the transmission;
    a signal processing unit electrically connected to the signal collecting unit;
    a motor control unit in operative communication with the signal processing unit;
    the transmission control unit in operative communication with the signal processing unit, wherein the signal processing unit configured to:
        receive the rotational speed of the transmission;
        determine whether a gear-position shifting is required based on the received rotational speed of the transmission;
        if a gear-position shifting is required, send instructions to the motor control unit to regulate the torque or the rotational speed of the motor; and
        after the torque or rotational speed of the motor has been regulated, send instructions to the transmission control unit to disengage or engage the transmission.

3. The apparatus of claim 2, wherein the signal collecting unit is a rotational speed sensor.

4. A clutchless transmission apparatus for controlling gear-position shifting, comprising:
    a motor;
    a transmission having an input shaft for receiving power;
    the motor configured to supply power to the input shaft of the transmission;
    a control device operatively coupled to the motor and to the transmission, wherein the control device is configured to:
        determine whether a gear-position shifting is required based on a rotational speed of the transmission;
        if a gear-position shifting is required, regulate a torque of the motor to control the transmission to disengage, and then regulate a rotational speed of the motor based on a rotational speed of the transmission to control the transmission to engage;
    wherein the control device further includes:
        a signal collectin unit configured to determine a rotational speed of the transmission;
        a signal processing unit electrically connected to the signal collecting unit;
        a motor control unit in operative communication with the signal processing unit;
        a transmission control unit in operative communication with the signal processing unit, wherein the signal processing unit configured to:
            receive the rotational speed of the transmission;
            determine whether a gear-position shifting is required based on the received rotational speed of the transmission;
            if a gear-position shifting is required, send instructions to the motor control unit to regulate the for torque or the rotational speed of the motor; and
            after the torque or rotational speed of the motor has been regulated, send instructions to the transmission control unit to disengage or engage the transmission
    wherein the signal processing unit is further configured to store:
        rotational speed threshold values (Si) each corresponding to a gear position;
        a plurality of torque values (Mi) of the motor under zero load at each rotational speed threshold value (Si); and
        transmission ratio values (Ki) each corresponding to a gear position;
    wherein the signal collecting unit configured to collect the current rotational speed (S) of the transmission in real time;
    wherein the signal processing unit configured to:
        receive the current rotational speed (S);
        compare the current rotational speed (S) with the rotational speed threshold values (Si) to determine whether a gear-position shifting is required at the current rotational speed (S);
        if a gear-position shifting is required:
            determine a torque (M) and a transmission ratio (K) corresponding to the current rotational speed (S);
            select a target gear position according to the current gear position;
            send instructions to the motor control unit to regulate the torque or rotational speed of the motor;
            send instructions to the transmission control unit to disengage or engage the transmission in accordance with the torque and rotational speed of the motor;
    wherein the motor control unit configured to receive instructions for regulating the torque or rotational speed of the motor from the signal processing unit and regulate the torque of the motor to a value of (M), and regulate the rotational speed of the motor to a value of (S)/(K); and
    wherein the transmission control unit configured to:
        receive the instructions from the signal processing unit to disengage or engage the transmission;
        instruct the transmission to disengage when the torque of the motor is regulated to a value of (M);
        instruct the transmission to engage to the target gear position when the rotational speed of the motor is regulated to a value of (S)/(K).

5. The apparatus as claimed in claim 4, wherein:
the motor control unit is configured to send a feedback signal to the signal processing unit indicating that torque synchronization is completed when the torque of the motor is regulated to a value of (M);
the signal processing unit is configured to send an instruction to the transmission control unit to disengage the transmission upon receiving the feedback signal indicating the torque synchronization is completed;
the transmission control unit is configured to send a feedback signal to the signal processing unit indicating the disengagement is completed;
the signal processing unit is configured to receive updated rotational speed (S') of the transmission, and send an instruction to the motor control unit for regulating the rotational speed of the motor upon receiving the feedback signal indicating the disengagement is completed;
the motor control unit is configured to send a feedback signal to the signal processing unit indicating the rotational speed synchronization is completed when the rotational speed of the motor is regulated to a value of (S')/(K); and
the signal processing unit is configured to send an instruction to the transmission control unit for engaging the transmission upon receiving the feedback signal indicating the rotational speed synchronization is completed.

6. The apparatus of claim 4, wherein the transmission further includes a gear-position shifting actuator configured to control the engagement and disengagement of the transmission under electrical control by the transmission control unit.

7. The apparatus of claim 4, wherein the number of the rotational speed threshold values (Si) is equal to N;
where (Si)=maximum rotational speed×i/N; and
where, $2 \leq N < 10$, i is an integer, and $0 < i < N$.

8. The apparatus of claim 4 wherein
the number of the rotational speed threshold values (Si) is equal to 2N;
where (Si)=maximum rotational speed×i/N±Y;
where, $2 \leq N < 10$, i is an integer, and $0 < i < N$; and
Y is much smaller than (Si) and can differ for different threshold values (Si).

9. A control method for shifting a gear-position in an apparatus having a motor and a transmission, the method comprising:
determining whether a gear-position shifting is required based on a rotational speed of the transmission;
if a gear-position shifting is required:
regulating a torque of the motor to control the transmission to disengage;
regulating the rotational speed of the motor based on the rotational speed of the transmission to control the transmission to engage;
storing a plurality of rotational speed threshold values (Si) each corresponding to a gear position;
storing a plurality of torque values (Mi) of the motor under zero load at each rotational speed threshold value (Si);
storing a plurality of transmission ratios (Ki) each corresponding to a gear position;
determining a current rotational speed (S) of the transmission;
comparing the current rotational speed (S) with each of the rotational speed threshold values (Si) to determine whether a gear-position shifting is required at the current rotational speed (S);
if a gear-position shifting is required, determining a torque (M) and a transmission ratio (K) corresponding to the current rotational speed (S);
selecting a target gear position according to the current gear position;
regulating a torque of the motor to a value of (M) and regulating a rotational speed of the motor to a value of (S)/(K)
when the torque of the motor is regulated to a value of (M), instructing the transmission to disengage; and
when the rotational speed of the motor is regulated to a value of (S)/(K), instructing the transmission to engage to the target gear position.

10. The method as claimed in claim 9, further comprises:
determining a rotational speed of the transmission in real time;
determining whether a gear-position shifting is required at the determined rotational speed;
if a gear-position shifting is required, regulating a torque and a rotational speed of the motor;
when the regulation of the torque of the motor is completed, disengaging the transmission; and
when the regulation of the rotational speed of the motor is completed, engaging the transmission.

11. The method as claimed in claim 9, further comprising:
when the torque of the motor is regulated to a value of (M), sending a feedback signal indicating that torque synchronization is completed;
disengaging the transmission upon receiving the feedback signal indicating the torque synchronization is completed;
instructing the transmission to disengage, and sending a feedback signal indicating that disengagement is completed;
determining an updated rotational speed (S') of the transmission;
when the rotational speed of the motor is regulated to a value of (S')/(K), sending a feedback signal indicating that a rotational speed synchronization is completed; and
engaging the transmission to the target gear position upon receiving the feedback signal indicating the rotational speed synchronization is completed.

12. The method of claim 9, wherein the number of the rotational speed threshold values (Si) is equal to N,
where (Si)=maximum rotational speed×i/N;
where, $2 \leq N < 10$;
where i is an integer; and
where $0 < i < N$.

13. The method of claim 9, wherein the number of the rotational speed threshold values (Si) is equal to 2N;
where (Si)=maximum rotational speed×i/N±Y;
where, $2 \leq N < 10$;
where i is an integer;
where $0 < i < N$; and
where Y is much smaller than (Si) and can differ for different threshold values (Si).

* * * * *